R. M. LOCKWOOD & S. H. BARTLETT,

Assignors, by mesne assignments, to THE MOLECULAR TELEPHONE CO.

TRANSMITTER FOR TELEPHONES.

No. 10,183. Reissued Aug. 15, 1882.

WITNESSES

Franck L. Durand

R. M. Smith

Robert M. Lockwood

Samuel H. Bartlett

INVENTORS.

by Geo. H. Smith

Attorney

THE NORRIS PETERS CO., PHOTO-LITHO., WASHINGTON, D. C.

UNITED STATES PATENT OFFICE.

ROBERT M. LOCKWOOD AND SAMUEL H. BARTLETT, OF NEW YORK, N. Y., ASSIGNORS, BY MESNE ASSIGNMENTS, TO THE MOLECULAR TELEPHONE COMPANY, OF SAME PLACE.

TRANSMITTER FOR TELEPHONES.

SPECIFICATION forming part of Reissued Letters Patent No. 10,183, dated August 15, 1882.

Original No. 228,826, dated June 15, 1880. Application for reissue filed April 8, 1882.

*To all whom it may concern:*

Be it known that we, ROBERT M. LOCKWOOD and SAMUEL H. BARTLETT, both of the city, county, and State of New York, have invented certain new and useful Improvements in Transmitters for Telephones, of which the following is a specification.

Our invention differs essentially from telephonic transmitters heretofore devised in that its effectiveness depends not upon the vibration or movement bodily of a diaphragm or equivalent against which the sound-waves are directed, but upon a movement which may be termed "molecular," inasmuch as it is transmitted from molecule to molecule of a non-resonant transmitting material, which, as a body, remains stationary while serving as a conducting agent between the aerial sound-waves and the microphone which controls the volume, pitch, and variation of sound transmitted to and through the wires.

In the practice of the invention a microphone of any suitable character, and provided with suitable transmitting-wires, is supported or partially embedded in cork or an equivalent non-resonant material, so that when the sound-waves produced by the voice or other sound-producing agent are directed against the external surface of the cork or other non-resonant material a molecular disturbance in the structure of the latter results from the impact and the absorption of the sound-waves, which, being communicated to the microphone, causes it to be correspondingly disturbed, so that the original sound is reproduced at other portions of the circuit in a receiver of any appropriate kind.

Figure 1:
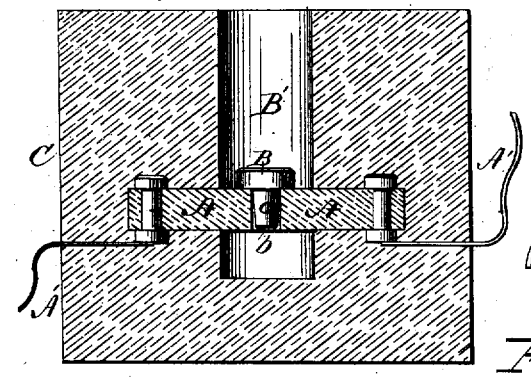
Figure 2:
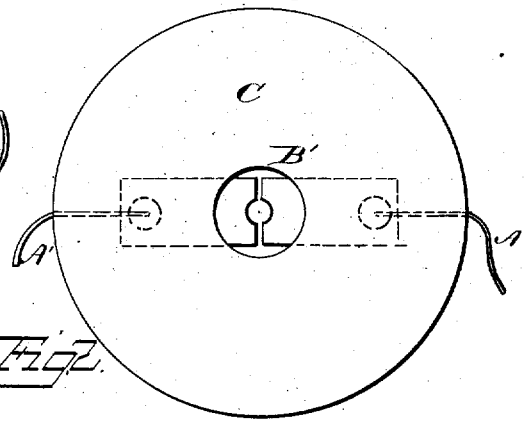
Figure 3:
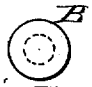
Figure 4:
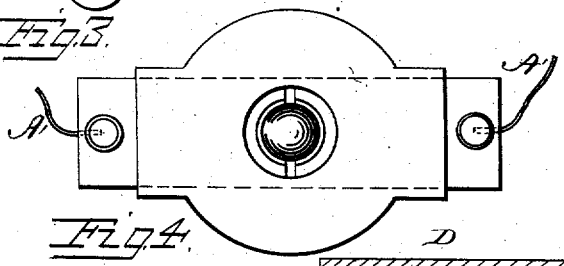
Figure 5:
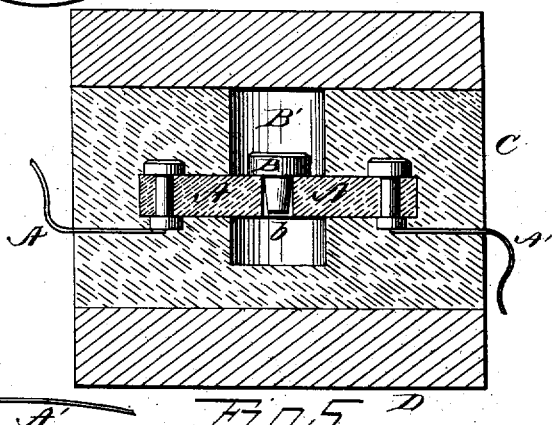
Figure 6:
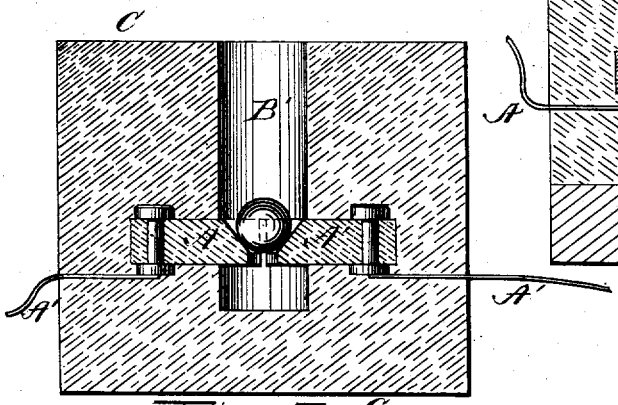

Figures 1, 5, and 6 of the accompanying drawings are sectional views representing a telephonic transmitter illustrating our invention. Figs. 2 and 3 show in plan view the parts included in Fig. 1, and Fig. 4 shows certain of the parts included in Fig. 6.

The microphone shown is composed of two bars, A A, the adjacent sides ro ends of which approach each other, but have a greater or less space between them. They are preferably of carbon of the kind well known to electricians; but they may be of metal, which latter, however, so far as our experiments have extended, has been found to be inferior to carbon. To these bars suitable telephonic wires, A′ A′, are connected.

In the construction shown in Figs. 1, 2, and 5 the adjacent ends of the bars are hollowed out, so as to provide a circular opening, *b*, between them, which receives the stem *c* of a button, B, resting by gravity upon the upper surface of the adjacent ends of the bars A A. This button should be of carbon or other material suitable for the bars A, and the pin or stem *c* may be of wood or other suitable material, its office being simply to retain the button in position.

The microphone is connected with and supported by a piece, block, or mass, C, of cork or other sound-absorbent non-resonant material, which in the drawings is shown provided with a central chamber, B′, with pockets or recesses at the sides thereof for the reception and retention of the outer ends of the bars A, the inner ends of said bars, with which the button B is in contact, projecting within the chamber B′, which also accommodates the button B, as shown.

In the operation of the apparatus the sound-waves produced in the air by the voice or other sound-producing agent strike the external surface of the cork, and, instead of being reflected therefrom as from a hard substance and passing off in mechanical vibrations, are absorbed by the cork and transmit their force from molecule to molecule of the non-resonant mass or block until such molecular disturbance reaches and is transmitted to the microphone; but inasmuch as the degree of this molecular disturbance varies with that of the impact on the surface of the cork and the amount of absorption of the sound-waves thereby, it follows that this molecular disturbance in passing from the electrodes to the connecting-button will be more or less modified, as the surfaces of contact between said button and the electrodes provide different conditions from those afforded in the homogeneous material of the electrodes themselves. This modification or disturbance in the relation of the button to the bars, although not susceptible to mechanical measurement, and itself consisting rather in a changed condition of the points of contact of the touching surfaces than in any change in their position, is responsive to every modification in the sound-waves brought to bear against the cork, and the microphone, being thus responsive to every variation in the original sound, insures its transmission through the wires to any suitable receiver.

Other forms or constructions of microphone may be employed in connection with the cork, as shown in Figs. 4 and 6, where a ball of carbon or other suitable material is shown resting in a hemispherical socket formed in the adjacent ends of the bars A.

When desired the non-resonant material C may be inclosed between metal plates D D.

From the foregoing description it will be understood that we do not wish to limit ourselves to any particular form or construction of microphone, as any suitable or preferred form of microphone may be employed, so long as it is combined with a block or support of cork or other suitable non-resonant material, through which the sound-waves are transmitted by molecular action or disturbance to the microphone, instead of being communicated thereto through mechanical or bodily vibration, as in the ordinary method.

Having now described our invention, what we claim as new is—

1. A microphone-transmitter for telephones, consisting of electrodes combined with a block or support of cork or equivalent non-resonant material, substantially as described, whereby said electrodes are covered or protected from the direct action of atmospheric sound-waves, said waves impinging upon the surface of and being transmitted through said non-resonant material to the electrodes, substantially as specified.

2. Plates or bars of carbon or other conducting material arranged with their adjacent sides or ends out of contact, and having their opposite ends firmly supported in a non-resonant material, in combination with the interposed button, arranged and operating substantially as described.

ROBT. M. LOCKWOOD.
SAMUEL H. BARTLETT.

Witnesses:
M. LOCKWOOD,
C. H. HANKINSON.